April 30, 1963 M. U. BAGWELL 3,087,431
APPARATUS FOR MONITORING PRODUCTION OR TRANSPORTATION EQUIPMENT
BY DETECTING AND INDICATING MALFUNCTION OF PUMP
Filed Aug. 29, 1957 2 Sheets-Sheet 1
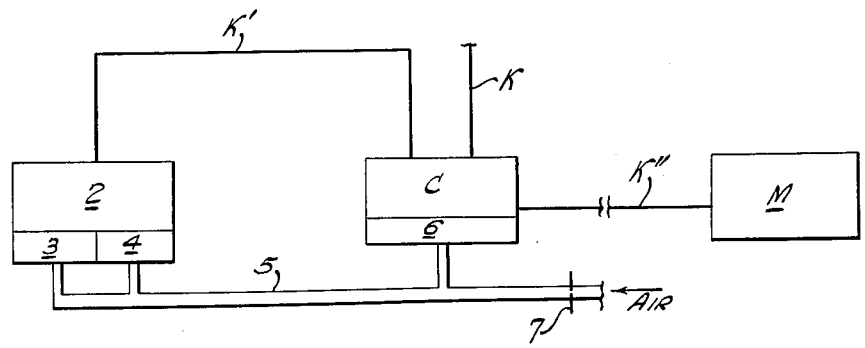
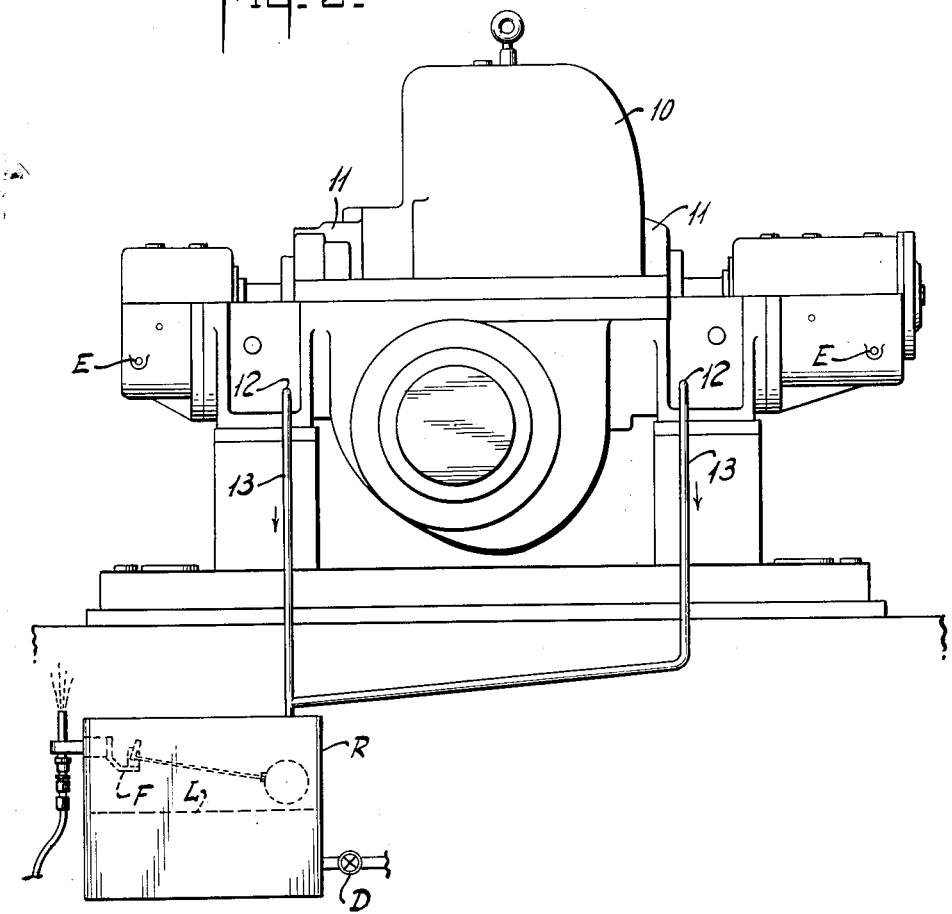

April 30, 1963 M. U. BAGWELL 3,087,431
APPARATUS FOR MONITORING PRODUCTION OR TRANSPORTATION EQUIPMENT
BY DETECTING AND INDICATING MALFUNCTION OF PUMP
Filed Aug. 29, 1957 2 Sheets-Sheet 2
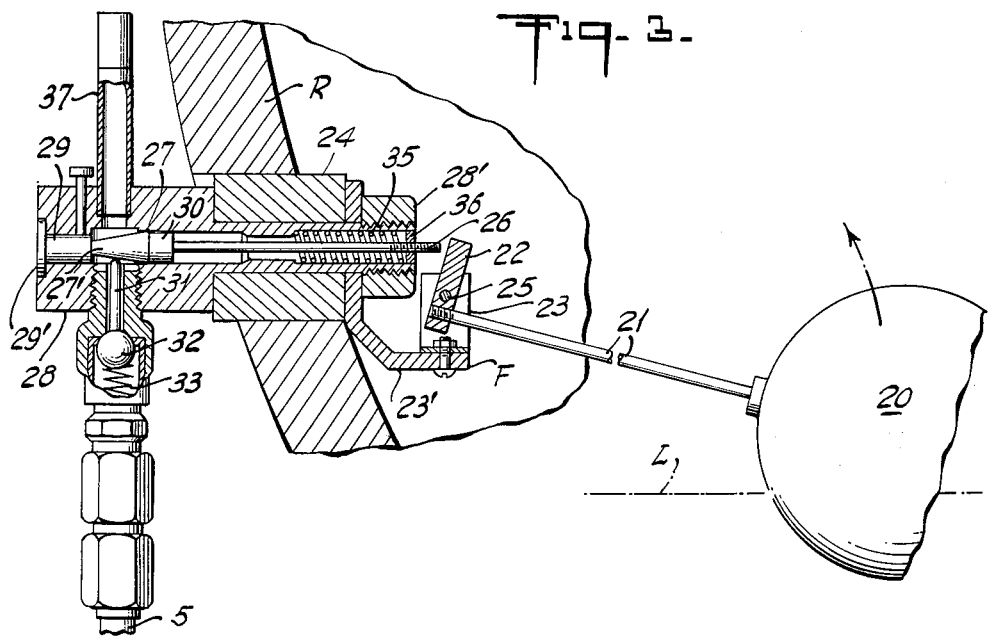
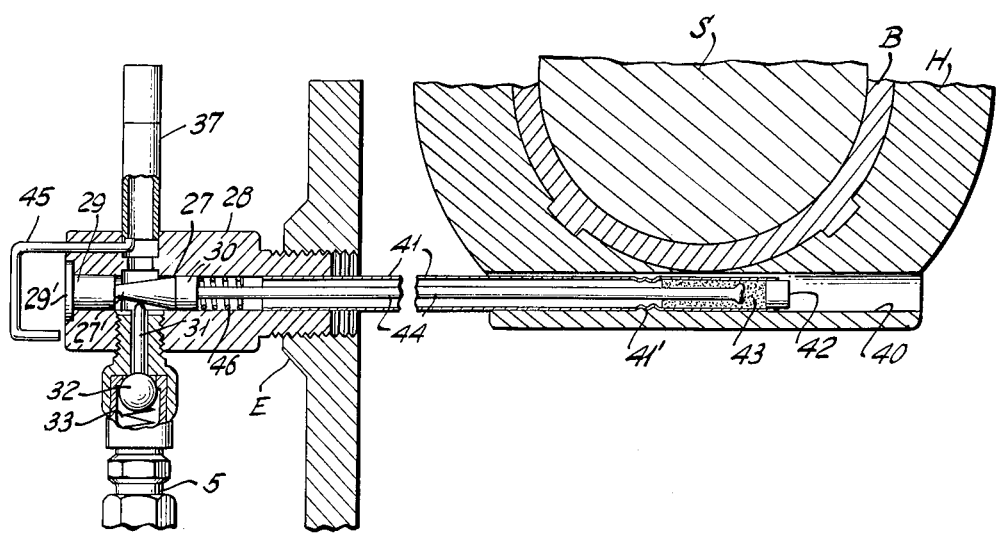

3,087,431
APPARATUS FOR MONITORING PRODUCTION OR TRANSPORTATION EQUIPMENT BY DETECTING AND INDICATING MALFUNCTION OF PUMP
Marshall U. Bagwell, Houston, Tex., assignor to The Texas Pipe Line Company, Houston, Tex., a corporation of Texas
Filed Aug. 29, 1957, Ser. No. 681,039
12 Claims. (Cl. 103—25)

This invention relates generally to a device for the protection of mechanical equipment used in the production or transportation of petroleum. In one of its more specific aspects, it concerns part of a monitoring set-up for such equipment whereby an automatic control system detects and indicates unsatisfactory operation of a pump or equipment bearing by an appropriate signal and/or may actuate means to close down the pumping unit.

In a pipeline station for transporting petroleum products by pumping, or in a petroleum-producing field, a substantially complete and constant personal inspection of the functioning of the mechanical equipment is expensive because of the number of personnel involved, yet is necessary in order to keep the pipeline station or field operating properly. Furthermore, on occasion, the unsatisfactory operation of equipment, such as a pumping unit, may develop soon after an inspection, or when personnel is distant at the opposite end of a pipeline pump station or producing field or otherwise unavailable, so that by the time the inspection is repeated, considerable damage to the unit may result. For example, a pumping unit in the system may fail due to improper lubrication and result in a shut down and loss in pumping capacity. Particular examples would be a damaged pump bearing caused by insufficient lubrication, or excess leakage at the packing glands of the stuffing boxes of the pump.

Accordingly, it is an object of this invention to provide a means by which the malfunction of mechanical pumping or production equipment may be detected.

It is another object of this invention to provide means to indicate which part of a pumping unit, operating unsatisfactorily, must be inspected for correction.

Another object of the invention is to provide means by which mechanical equipment used in transporting or producing petroleum may be protected from damage due to insufficient lubrication.

And another object of the invention is to provide a device for detecting and indicating excessive bearing temperatures in a pumping unit.

Still another object of the invention is to provide a means by which excess pump shaft seal leakage may be detected.

Another object of the invention is to provide an improved device for an automatic close down of the pumping operation of mechanical oil transportation and oil well production equipment when its malfunction is detected.

Still another object of the invention is to provide an automatic detection of malfunction and close down device for a pumping unit which is simple and inexpensive to manufacture, yet is efficient in operation.

And still another object of the invention is to provide a detection device for the malfunction of lubrication of pumping equipment which, after indication of faulty operation, cannot be reset without proper inspection being made for determination of the fault.

These and other objects and advantages of the invention will be apparent from the following description of the accompanying drawings in which:

FIG. 1 is a diagrammatic showing of an automatic control system as part of a monitoring set-up for petroleum pumping or production equipment, in which the present invention is practiced;

FIG. 2 is an elevation view of a centrifugal pump showing an apparatus set-up for detecting excess seal leakage and the location for the bearing protection devices;

FIG. 3 is an elevation view, partly in section, showing the means by which excess seal leakage may be detected and indicated; and FIG. 4 is an elevation view, partly in section, showing the means by which excessive bearing temperature, due to insufficient lubrication, may be detected and indicated.

In accordance with the invention, there are disclosed structures by which the inefficient operation of the pumping unit of petroleum transportation and well production equipment may be detected and indicated to show either excess stuffing box leakage or overheating through lack of lubrication and thus the correction thereof expedited.

Referring to the drawings, FIG. 1 shows in block diagram form, part of a monitoring set-up with an automatic control system by which the malfunction of a pump may be detected and indicated, with either an alarm given or a warning signal transmitted, and/or an automatic shut down of the operation of the pump.

The pump at 2 is operatively associated with the seal leak detector, indicated generally at 3, and the bearing temperature indicator, indicated generally at 4, each of the latter two components containing a normally closed spring loaded valve 32 seated in a pressurized air line or conduit 5. This pressurized air line is connected also to a differential pressure switch 6, as part of the assembly indicated generally at the controller C, with the power supply for the latter shown at K. This pressure switch remains in closed position to complete an electrical circuit by the line indicated generally at K' with the pump, until either (or both) the detector or indicator becomes operative and causes the spring loaded valve 32 to open resulting in a circuit break. Under normal operating conditions, pressurized air is supplied to the conduit 5 through the orifice indicated at 7.

With the release of pressurized air when one (or both) of the spring loaded valves opens, the air pressure downstream of the orifice is reduced more rapidly than can be made up, because of the restriction in its supply due to the orifice in the air line. The reduction in air pressure causes the pressure switch to open and break the electrical circuit to the pump and thereby close down its operation.

Signals may be transmitted also between the controller C and the central monitor control M, over the transmission line indicated generally at K", for recording and control purposes.

Referring to FIG. 2, there is disclosed a conventional type centrifugal pump in which the applicant's improvement for detecting stuffing box leakage and for indicating insufficient lubrication of the bearings is applied. A centrifugal pump is disclosed generally at 10, with the location of stuffing boxes surrounding the impeller shaft being indicated at 11, 11. The stuffing box leakage drains are disclosed at 12, 12, with the drain pipes 13, 13, leading therefrom to the drain sump or reservoir R, located below the level of the pump impeller shaft and its stuffing boxes for the collection of the fluid leakage. Appropriate means for draining the reservoir are indicated generally at D. The means by which excessive stuffing box leakage is detected and indicated is attached to the wall of the reservoir R and is disclosed in expanded view in FIG. 3, to which reference is made now.

As the level L of the fluid leakage in the reservoir R reaches a predetermined height, the float operated mechanism, indicated generally at F, comes into operation to activate means for the further control of the pumping operation, including a signal or alarm and/or shut down of operation. The float operated mechanism F comprises the ball float at 20, supported by the arm 21, which is fastened to the pivoted lever rod member 22, supported in the frame 23. This frame 23, in turn, is supported by the frame member 23' which is attached to the bushing 24 inserted in an opening in the wall of the reservoir R. As the float rises (in the direction of the arrow) because of its buoyancy in the increasing level of the fluid leakage, it causes the lever rod member 22 to pivot around the pin 25 and to activate the leakage detection device by contact with the rod 26, which is fastened to part of the valve actuating means including a tapered plunger member 27. This plunger member is positioned in the axial bore hole of the housing 28, which is supported in the bushing 24 and fastened together by the locking means, such as lock nut 28'. As shown herein, the tapered plunger member 27 has at its outer and inner ends respectively cylindrical surfaces 29 and 30, which are spaced apart by a conical portion 27' having an inward taper beginning from the inner cylindrical surface 30. Outward movement of the plunger member 27 forces a pin or small plunger 31 against a spring loaded valve at 32, kept in seated position by the spring at 33, in the pressurized air line 5. The remaining elements of the leakage detection device include a seating flange at 29' joined to the outer cylindrical surface 29 of the plunger member 27, a retaining spring at 35 which is housed in the axial bore hole of housing 28, and a spring retaining washer 36 supported on the rod 26. These last elements serve to keep the detection device in closed position after it is reset. The air line 5 is charged with approximately 20 pounds p.s.i. air pressure, which is supplied through a very small orifice, approximately .020 inch diameter, which pressure acts against the spring loaded valves in the detector 3 and indicator 4, and the differential pressure switch 6.

When the rising ball float 20 forces the rod 26 and attached plunger member 27 outwardly, the tapered portion 27' pushes the pin or small plunger 31 downwardly to unseat the normally closed spring loaded valve at 32, so that pressurized air in the line 5 escapes past this valve faster than it can be supplied through the small orifice. The drop in pressure causes the contacts in the pressure switch 6 to open and break the electrical circuit to the pump, as well as to cause an alarm to be given, e.g. a light or a horn for prompt attention and/or a record signal to be sent from the controller C to the central monitor control M. The detection device will remain in its outward position where it has been moved by the action of the float. After the fluid leakage has been drained from the reservoir to an appropriate sump and necessary repairs or adjustments made to the packing gland of the faulty stuffing box, the device can be reset manually by pushing the plunger member 27 inwardly. In addition to the alarm which may be raised at the controller, it is possible to have a signal device, such as a whistle, located downstream of the check valve, at the exhaust, as shown at 37, for warning in the immediate vicinity.

Referring to FIG. 4, which discloses a device for the protection of pump bearings from excessive heat by its detection and indication, there is shown the pump shaft S, contacting the bearing B supported in the shell H. As shown herein, at the bottom of the shell H, there is a drilled hole 40 located adjacent the bearing B. The bearing temperature indicating device which is inserted into the drilled hole 40, includes a tubular member 41, which is closed at one end by a plug 42 to retain an alloy 43 having a low melting point of approximately 200° F. A number of crimps in the wall of the tubular member are indicated at 41' in order to retain the solidified plug of alloy 43 at the bottom of the tubular member.

A rod 44, shown having an upset end, is adapted to be embedded in the alloy 43 being held in position during solidification of the fused alloy. This rod is fastened to tapered plunger member 27, which functions in the same way as described in FIG. 3, the numbering of the identical parts being the same. In addition, a stop member 45 is shown attached to housing 28, which is shown inserted into the wall of the bearing casing (at E, FIGS. 2 and 4), so that when the unseating spring 46, positioned in the bore of the housing 28 between the plunger member 27 and the end of the tubular member 41 forces the plunger member 27 outwardly, it retains the indicating device within the bore hole of the housing.

The operation of the bearing protective device against excessive temperatures therein follows. As the bearing temeprature rises due to improper lubrication, heat is transferred from the overheated bearing to the temperature indicating device in the drilled hole 40 and melts the plug of alloy 43, thus allowing the spring 46 to pull the rod 44 outwardly and forcing the tapered portion 27' of the plunger member 27 against the pin or small plunger 31 to unseat the spring loaded valve 32. The action which follows is the same as that described for FIG. 3, the drop in air pressure activating the pressure switch 6 to break the electrical circuit to the pump 2 to close down its operation, and/or give an alarm or a warning signal and/or transmit a signal to the monitor control M. The indicating device remains in its outward position, retained by the stop 45, as an indication of which bearing has overheated. When the bearing has been inspected and appropriate repairs made, the indicating device can be reset by submerging the sealed end of the tubular member 41 in boiling water to melt the alloy and then by holding the rod 44 in reset position while the tubular member and alloy cool.

In summary, the advantages of the devices disclosed in FIGS. 3 and 4 include the following: they are inexpensive, direct and fast acting and easy to test; they are safe for use in hazardous areas and do not require an explosion proof construction, since simple low pressure copper tubing connections only are required for the air supply line; they are vibration proof and may be connected or disconnected while the pump is in operation, if necessary; and an unlimited number of the devices may be connected to a common air supply line 5.

Thus there has been shown apparatus for the protection of a pumping unit, which undergoes long periods of unattended operation and infrequent personal inspection, so that inefficient operation of a pump may be detected and corrected reasonably quickly and the bearings protected from injury resulting from overheating.

Obviously, many modifications and variations of the invention, as hereinbefore set forth, may be made without departing from the spirit and scope thereof, and therefore only such limitaions should be imposed as are indicated in the appended claims.

I claim:

1. In a pump assembly having an electrical circuit for controlling the operation thereof, said circuit including means affected by a change in pressure, the combination of a conduit containing a fluid normally at a constant pressure joined to said last mentioned means, the pressure responsive means being adapted to terminate the pump operation of said pump assembly when the pressure drops in said conduit, means in normally closed position located in said conduit spaced downstream from the first mentioned means, means to open said means in normally closed position and responsive to malfunctioning of said pump, and means positioned upstream of the first mentioned means for controlling fluid flow in said conduit and thereby effecting a change in pressure therein.

2. In an automatic control system including an electrical circuit as part of a monitoring set-up for the proper operation of a prime mover for fluid, the combination comprising a pump having a driving shaft with stuffing boxes and bearings therefor, means for governing the operation of said pump upon detection of its malfunction at said stuffing boxes and said bearings interconnected therewith including a pressure actuated switch for control of said electrical circuit for said governing of the pump operation, a pressurized fluid supply line in communication with said switch and having fluid flow control means therein, and means for retaining fluid pressure in said pressurized fluid supply line comprising a spring loaded valve, and means joined to and responsive to the malfunctioning of said pump for opening said spring loaded valve including a valve actuating member having a tapered surface and a plunger having ends each respectively in contact with said tapered surface and said spring loaded valve.

3. In a control system as defined in claim 2, said means responsive to the malfunctioning of said pump comprising a reservoir for receiving leakage from said stuffing boxes thereof, and means for moving said valve actuating member including a pivoted float and lever rod member supported by the wall of said reservoir, said lever rod member contacting and moving said actuating member as said float is raised in said chamber as said leakage is collected in said reservoir.

4. In a control system as defined in claim 2, said means responsive to the malfunctioning of said pump including a fusible member in heat exchange relationship and so subject to excessive heat of an improperly lubricated bearing, and spring means for extracting said valve actuating member from said fusible member upon its fusing so that said tapered surface of said actuating member forces said plunger to open said spring loaded valve.

5. In an automatic control and indicating system as part of a monitoring setup for mechanical equipment including a centrifugal pump having stuffing boxes and bearings associated with the driving shaft thereof, and a controller therefor including an electrical circuit, the combination of means for detecting and indicating the malfunctioning of said pump at said bearings including a pressurized fluid line and a spring loaded valve therein and a pressure responsive switch in communication with said fluid line, means operatively associated with and responsive to the malfunctioning of said pump for unseating said spring loaded valve including a valve actuating member having means for indicating malfunction when said member is in actuating position, said means responsive to the malfunctioning of said pump for moving said spring loaded valve into open position for free fluid flow condition comprising a device for indicating an increase in the pump bearing temperature including a tubular member having a rod disposed therein and a low melting point alloy retained in said tubular member and in which one end of said rod is fixed, a plunger member having a tapered surface affixed to the opposite end of said rod, a plunger having its ends in contact respectively with said tapered surface of said plunger member and with said spring loaded valve for moving the latter as said plunger member is moved from closed position for fluid flow, spring means for urging said rod and plunger member out of contact with said alloy upon its fusing, and means for restraining the extent of the withdrawal of said rod and plunger member by said spring means, said tubular member being housed adjacent the pump shaft.

6. In an automatic control and indicating system as part of a monitoring setup for mechanical equipment including a centrifugal pump having stuffing boxes and bearings associated with the driving shaft thereof, the combination of means for detecting and indicating the malfunctioning of said pump at said stuffing boxes including a pressurized fluid line and a spring loaded valve therein and a pressure responsive switch in communication with said fluid line, means operatively associated with and responsive to the malfunctioning of said pump for unseating said spring loaded valve including a valve actuating member having means for indicating malfunction when said member is in actuating position, said means for unseating said spring loaded valve being responsive to the malfunctioning of said pump comprising a reservoir for collecting fluid leaking from said stuffing boxes of said driving shaft of said pump, means responsive to leakage fluid collected in said reservoir thereby indicating the level thereof and comprising a pivoted float means and actuated lever, a rod positioned in the line of movement of said lever, a valve actuating plunger member having a tapered surface joined to said rod, spring means for retracting said rod and plunger member means into seated position, and means for detecting malfunctioning of said pump including a plunger having its ends in contact respectively with said tapered surface of said valve actuating plunger member and with said spring loaded valve for unseating the latter as said plunger member is moved from its seated position.

7. In a control system of a monitoring set-up for detecting improper lubrication of a rotating shaft of a pumping unit having stuffing boxes and bearings therefor including excess shaft seal leakage past said stuffing boxes and insufficient lubrication of said rotating shaft at said pump bearings, the combination to govern the operation of said pumping unit comprising a controller including an electrical circuit with a pneumatically controlled switch therein, a pressurized fluid line with a spring loaded valve seated therein for maintaining pressure in said line interconnected with said switch, means operatively associated with said pumping unit and responsive to said improper lubrication at said stuffing boxes for releasing pressure in said fluid line, means joined to and responsive to a pressure change in said fluid line transmitting a control signal for further governing of the operation of said pumping unit, said means responsive to said improper lubrication including a pivoted float and lever arm and a valve actuating means having a compound construction including a tapered surface construction moved by said lever arm, a plunger in contact at its ends respectively with said tapered surface construction and with said spring loaded valve in said fluid line, whereby movement of said plunger in contact with said tapered surface construction unseats said spring loaded valve.

8. In a monitoring set-up for detecting improper lubrication of a bearing for a rotating shaft of a pumping unit including excessive seal leakage and insufficient lubrication of the pump shaft at said pump bearing, a control system to govern said pumping unit comprising, in combination, a controller for said pumping unit having an electrical circuit with a pneumatically controlled switch therein, a pressurized fluid line interconnected with said switch for keeping the same in closed position, means operatively associated with said pumping unit and responsive to said improper lubrication for releasing pressure in said fluid line, and means joined to and responsive to the pressure drop in said fluid line transmitting a control signal for further governing of the operation of said pumping unit, said means responsive to said improper lubrication including a fusible member exposed to the heat generated by an insufficiently lubricated bearing, a retractable member comprising a valve actuating means lodged in said fusible member, and spring means for urging said valve actuating means in relatively outward position, said valve actuating means having a surface tapering inwardly relative to its inner end, and a plunger in contact with said tapered surface for unseating a spring loaded valve upon outward movement of said retractable member, said spring loaded valve being positioned in said fluid line to retain pressure therein.

9. In combination with a prime mover for a fluid, said prime mover comprising a pump with a rotating shaft having stuffing boxes and bearings, an automatic control system for governing the prime mover operation responsive to malfunctioning thereof from faulty lubrication of said rotating shaft, which includes both excess leakage past said stuffing boxes and from insufficient lubrication of said bearings for said rotating shaft, comprising an electrical circuit having a pneumatically controlled switch and with a pressurized air line having a spring loaded valve in normally closed position therein interconnected therewith, and means actuated by malfunctioning of said prime mover to open said spring loaded valve in said pressurized air line, and means responsive to a drop in pressure in said pressurized air line for indicating said malfunctioning by apropriate signals to include visible and audble signals and prime mover unit shutdown, said means actuated by malfunctioning of said prime mover including a rod and a plunger member joined thereto and supported by said prime mover and having inner and outer cylindrical surfaces spaced by an outwardly tapering surface angled inwardly with respect to the inner cylindrical surface, a plunger supported in said air line located downstream of said spring loaded valve and in contact at its ends therewith and with said tapered surface whereby said spring loaded valve is unseated as said plunger member moves outwardly.

10. In a control system as defined in claim 9, means to collect stuffing box fluid leakage from said pump including means for interconnection with said pump, means supported by the fluid leakage collecting means responsive to a predetermined level of collected fluid leakage comprising a float with a pivoted lever arm whereby as said float rises with the level of collected fluid leakage, contact is made between said lever arm and said rod joined to said plunger member thereby to move said plunger and unseat said spring loaded valve.

11. In a control system as defined in claim 9, in which said prime mover comprises a centrifugal pump, means for protecting said pump bearings from excess heat due to faulty lubrication consisting of a contact element containing fusible material of low melting temperature and so responsive to excessive heat, said pump bearings each having a housing having a tubular bore adjacent said bearing surface in which said element is housed, said rod joined to said plunger member being retained in the unfused material during normal pump operation, and spring means for moving said rod outwardly from said material when fused thereby to activate said system for control of the further operation of said pump.

12. In a fluid pumping unit having a pump as a prime mover for fluid, a driving shaft therefor, liquid lubricated bearings and stuffing boxes for said driving shaft of said pump, and a controller for said pump having an electrical circuit, the combination of a pneumatically controlled switch in said electrical circuit of said controller, a line for supplying fluid under pressure to said pneumatically controlled switch to normally maintain the same in closed position, a choke in said line on the upstream side of said pneumatically controlled switch to limit the rate of fluid supply thereto, a first means in said line on the downstream side of said switch normally being in closed position, means responsive to leakage of fluid past at least one of said stuffing boxes associated with said downstream side of said line for opening said first means in said line upon predetermined fluid leakage, and a second means responsive to the temperature of at least one of said bearings associated with said downstream side of said line also for opening said first means in said line upon a predetermined temperature rise of said one of said bearings, the operation of either as well as both of said first and second means resulting in a pressure drop in said line thereby to open said pneumatically controlled switch and break said electrical circuit of said controller for said pump.

References Cited in the file of this patent
UNITED STATES PATENTS

| | | |
|---|---|---|
| 74,442 | Springer | Feb. 11, 1868 |
| 810,237 | Wadsworth | Jan. 16, 1906 |
| 1,018,253 | McWilliams et al. | Feb. 20, 1912 |
| 1,382,735 | McAulay | June 28, 1921 |
| 1,426,206 | Lybeck | Aug. 15, 1922 |
| 1,594,483 | Yoemans | Aug. 3, 1926 |
| 1,682,331 | Goyne et al. | Aug. 28, 1928 |
| 2,086,869 | Herron | July 13, 1937 |
| 2,326,138 | Grant | Aug. 10, 1943 |
| 2,335,639 | Brandstrom | Nov. 30, 1943 |
| 2,439,474 | Kennelly | Apr. 13, 1948 |
| 2,499,318 | Jungerhans | Feb. 28, 1950 |
| 2,675,514 | Smith | Apr. 13, 1954 |
| 2,688,382 | Georgeff | Sept. 7, 1954 |
| 2,688,719 | Busquet | Sept. 7, 1954 |
| 2,769,395 | Olson | Nov. 6, 1956 |
| 2,803,425 | Little | Aug. 20, 1957 |
| 2,805,774 | Griswold | Sept. 10, 1957 |

FOREIGN PATENTS

| | | |
|---|---|---|
| 2,688 | Great Britain | July 5, 1878 |
| 311,909 | Gremany | Apr. 29, 1919 |

OTHER REFERENCES

The Handbook of Measuring and Control, M. F. Behar, Instruments Publishing Co., Pittsburgh, Pa.

Automatic Control of Heating and Air Conditioning, John E. Haines, McGraw-Hill Co., page 4, last paragraph; page 8, "Source of Power"; and chapter 5 relied upon.

Heating and Air Conditioning by Allen and Walker, McGraw-Hill Book Company, New York, 1946 Edition, pages 274–275.

Sweet's Plant Engineering File for 1956, section 1h/mas., Masoneilan Co. "Condensed General Catalog No. 56," pages 12–15.